US011095436B2

(12) United States Patent
Soriano

(10) Patent No.: US 11,095,436 B2
(45) Date of Patent: Aug. 17, 2021

(54) KEY-BASED SECURITY FOR CLOUD SERVICES

(71) Applicant: KONICA MINOLTA BUSINESS SOLUTIONS U.S.A., INC., San Mateo, CA (US)

(72) Inventor: Randy Cruz Soriano, San Leandro, CA (US)

(73) Assignee: KONICA MINOLTA BUSINESS SOLUTIONS U.S.A., INC., Foster City, CA (US)

( * ) Notice: Subject to any disclaimer, the term of this patent is extended or adjusted under 35 U.S.C. 154(b) by 137 days.

(21) Appl. No.: 16/588,153

(22) Filed: Sep. 30, 2019

(65) Prior Publication Data

US 2021/0099288 A1    Apr. 1, 2021

(51) Int. Cl.
*H04L 29/06* (2006.01)
*H04L 9/08* (2006.01)
*H04L 29/08* (2006.01)
*H04L 9/32* (2006.01)

(52) U.S. Cl.
CPC .......... *H04L 9/0819* (2013.01); *H04L 9/3213* (2013.01); *H04L 9/3271* (2013.01); *H04L 67/303* (2013.01)

(58) Field of Classification Search
CPC ... H04L 9/0819; H04L 67/303; H04L 9/3213; H04L 9/3271
See application file for complete search history.

(56) References Cited

U.S. PATENT DOCUMENTS

| | | | | |
|---|---|---|---|---|
| 7,451,312 | B2 * | 11/2008 | Medvinsky | H04L 29/06 380/278 |
| 2002/0144151 | A1 * | 10/2002 | Shell | H04W 12/08 726/7 |
| 2003/0099353 | A1 * | 5/2003 | Goh | G07F 7/08 380/51 |
| 2016/0359974 | A1 * | 12/2016 | Miller | G06F 3/067 |
| 2019/0026450 | A1 * | 1/2019 | Egner | G06F 21/44 |
| 2020/0204544 | A1 * | 6/2020 | Soriano | H04L 63/0861 |

\* cited by examiner

*Primary Examiner* — Mahfuzur Rahman
(74) *Attorney, Agent, or Firm* — Squire Patton Boggs (US) LLP

(57) ABSTRACT

In providing cloud services, key-based security measures specific to a local network are utilized when an internal client terminal logs into the network to access cloud services, and when a remote client terminal connects directly to the cloud services. A cloud service computer references the credential authorization service of the local network, allowing key-based security measures of that network to be applied even when a remote client terminal connects directly to a cloud service computer. By referencing the local credential authorization service, it is possible to provide cloud services to different organizations that administer key-based security measures independently of each other.

20 Claims, 10 Drawing Sheets

KEY-BASED SECURITY FOR CLOUD SERVICES

FIELD

This disclosure relates generally to key-based security and, more particularly, to key-based security for a cloud computing environment.

BACKGROUND

It is often necessary to restrict access to electronic resources, such as data and computer applications. Security may be applied with the use of passwords and user identifications (IDs). Since passwords and user IDs may be stolen, additional security may be applied with the use of key pairs, one key in the pair being held by a user seeking entry, and the other key in the pair being held by a trusted person or location. When a user seeks entry, the trusted person or location issues a key for which the user must provide a matching key (response) in order to gain entry.

An issue arises in the context of cloud computing, where resources (cloud resources) reside outside of a secured network. An on-premises user, while plugged into the secured network, would log in using a responsive key and then gain access to cloud resources via the secured network. However, to allow a user to work remotely from the secured network, the off-premises user might connect directly to a server for cloud resources, instead of first logging into the secured network. The cloud service, having no ability to issue a key for which the user would provide the matching response, would allow access to cloud resources with only a valid password and user ID. Alternatively, the user might be allowed to log into the secured network via a conventional remote access VPN with a password and user ID, thereby bypassing key-based security measures.

There is a need for a method and system for applying key-based security to cloud resources from a remote environment.

SUMMARY

Briefly and in general terms, the present invention is directed to a method, system, and non-transitory computer-readable medium for applying key-based security.

In aspects, a method is performed by a computer for applying key-based security, the computer configured to provide client terminals, which have addresses associated with a network and have credentials authorized by a credential authorization service, with access to a cloud service application. The method comprises providing access to the cloud service application to an internal client terminal having one of the addresses associated with the network and having provided a credential that was authorized by the credential authorization service; receiving a first remote credential for accessing the cloud service application, the first remote credential provided by a first remote client terminal having an address that is not associated with the network; determining whether the first remote client terminal is a trusted device installed with an authorization broker for communicating with the credential authorization service; and performing a credential handling response for the first remote credential, the credential handling response being either: instructing the first remote client terminal to send, with use of the authorization broker installed on the first remote client terminal, the first remote credential to the credential authorization service to determine whether a key of the first remote credential is authorized for access, the instructing performed on condition that the first remote client terminal is a trusted device, or sending the first remote credential to the credential authorization service to determine whether a key in the first remote credential is authorized for access, the sending performed on condition that the first remote client terminal is not a trusted device. The method comprises, after a determination by the credential authorization service that the key of the first remote credential is authorized for access, receiving authorization information to provide the first remote client terminal with access to the cloud service application.

In aspects, a system applies key-based security and is configured to provide client terminals, which have addresses associated with a network and have credentials authorized by a credential authorization service, with access to a cloud service application. The system comprises a computer configured to perform a method comprising: providing access to the cloud service application to an internal client terminal having one of the addresses associated with the network and having provided a credential that was authorized by the credential authorization service; receiving a first remote credential for accessing the cloud service application, the first remote credential provided by a first remote client terminal having an address that is not associated with the network; determining whether the first remote client terminal is a trusted device installed with an authorization broker for communicating with the credential authorization service; and performing a credential handling response for the first remote credential, the credential handling response being either: instructing the first remote client terminal to send, with use of the authorization broker installed on the first remote client terminal, the first remote credential to the credential authorization service to determine whether a key of the first remote credential is authorized for access, the instructing performed on condition that the first remote client terminal is a trusted device, or sending the first remote credential to the credential authorization service to determine whether a key in the first remote credential is authorized for access, the sending performed on condition that the first remote client terminal is not a trusted device. The method comprises after a determination by the credential authorization service that the key of the first remote credential is authorized for access, receiving authorization information to provide the first remote client terminal with access to the cloud service application.

In aspects, a non-transitory computer-readable medium stores instructions which, when executed by a computer, cause the computer to perform a method for applying key-based security, the computer configured to provide client terminals, which have addresses associated with a network and have credentials authorized by a credential authorization service, with access to a cloud service application. The method comprises providing access to the cloud service application to an internal client terminal having one of the addresses associated with the network and having provided a credential that was authorized by the credential authorization service; receiving a first remote credential for accessing the cloud service application, the first remote credential provided by a first remote client terminal having an address that is not associated with the network; determining whether the first remote client terminal is a trusted device installed with an authorization broker for communicating with the credential authorization service; and performing a credential handling response for the first remote credential, the credential handling response being either: instructing the first remote client terminal to send, with use of the authorization broker installed on the first remote client terminal, the first remote credential to the credential authorization service to determine whether a key of the first remote credential is authorized for access, the instructing performed on condition that the first remote client terminal is a trusted device, or sending the first remote credential to the credential authorization service to determine whether a key in the first remote credential is authorized for access, the sending performed on condition that the first remote client terminal is not a trusted device. The method comprises after a determination by the credential authorization service that the key of the first remote credential is authorized for access, receiving authorization information to provide the first remote client terminal with access to the cloud service application.

The features and advantages of the invention will be more readily understood from the following detailed description which should be read in conjunction with the accompanying drawings.

DETAILED DESCRIPTION

Figure 1:
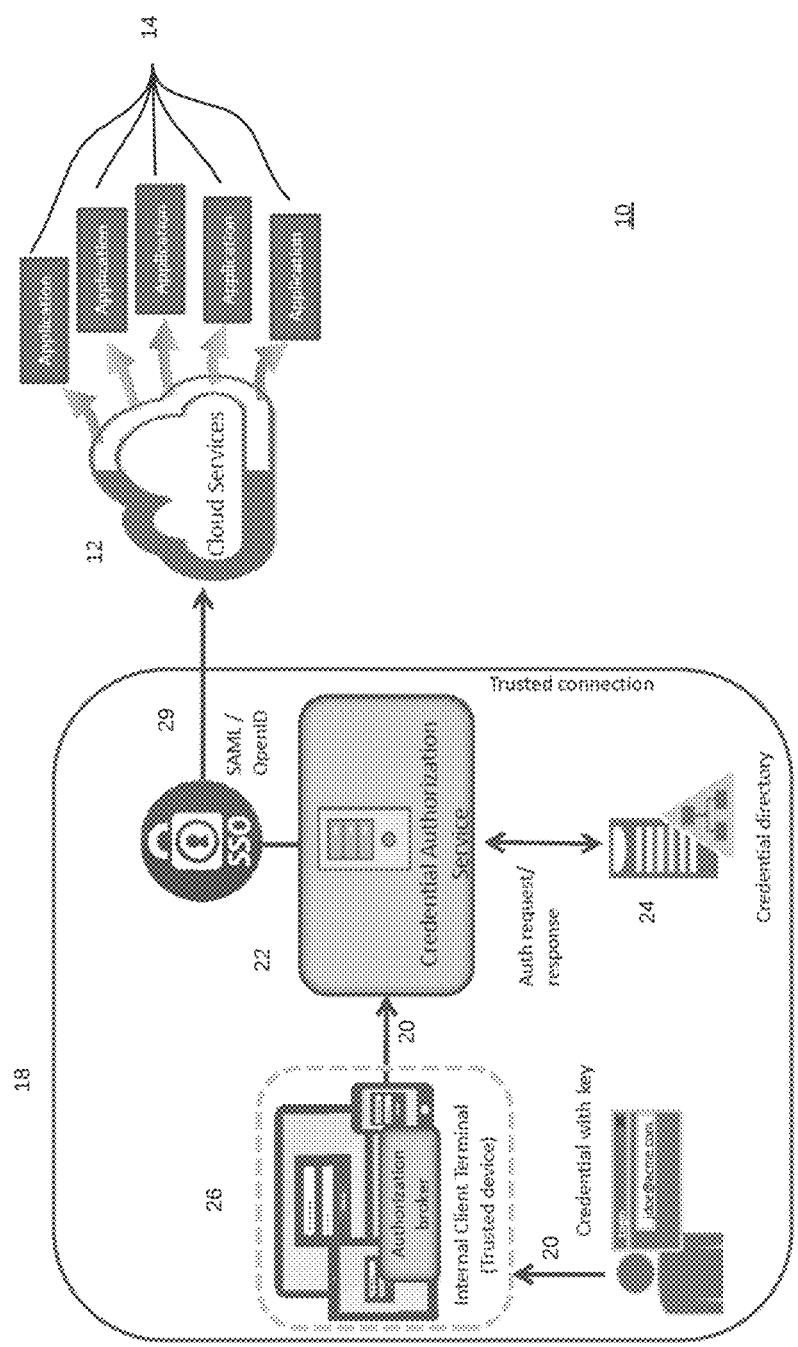
FIG. 1 is a schematic diagram showing an example system applying key-based security to a request by an internal client terminal, which has an address associated with a network, to access one or more cloud service applications.

Referring now in more detail to the drawings for purposes of illustrating non-limiting examples, wherein like reference numerals designate corresponding or like elements among the several views, there is shown in FIG. 1 example system 10 comprising cloud service computer 12 configured to apply key-based security for accessing one or more cloud service applications 14, which are computerized routines and associated data. Cloud service computer 12 serves as a gateway for accessing the cloud service applications 14.

Examples for cloud service applications 14 include applications for human resources management (e.g., payroll, employee time and attendance applications provided by Automatic Data Processing, Inc.), source code repositories (e.g., code management applications, such as Bitbucket™ provided by Atlassian Corporation), and file hosting/storage (e.g., services provided by Dropbox Inc.).

Cloud service computer 12 includes one or more computer processors and associated memory. As used herein, the term "computer processor" refers to one or more computer processors. The computer processor comprises electronic circuits that allow the computer processor to perform the method described herein. The cloud service computer may include memory, including a non-transitory computer-readable medium, storing instructions for performing the method described herein. For example, cloud service computer may comprise server class hardware running a server operating system. As discussed in detail below, cloud service computer 12 is configured to provide access to cloud service applications 14 to client terminals, which have addresses associated with a network and have credentials authorized by a credential authorization service.

FIG. 1 shows client terminal 16 connected to network 18. Network 18 has many Internet Protocol addresses (IP addresses) assigned to it, used by it, or otherwise associated with it for the purpose of identifying and addressing client terminals. As used herein, the term "address" and "addresses" encompass IP addresses and other types of numerical labels that serve the function of client identification and addressing. As used herein, the term "internal client terminal" means that a client terminal has one of the addresses associated with network 18. In addition, any client terminal having one of the addresses associated with network 18 is deemed to have a trusted connection. Client terminal 16 has one of the addresses associated with network 18, so it is referred to as internal client terminal 16. Although only one internal client terminal is illustrated, is to be understood that there may be additional internal client terminals connected to network 18.

By definition, any client terminal that has an address associated with a particular network, is an internal client terminal of that particular network. Any client terminal that has an address that is not associated with a particular network, is a remote client terminal with respect to that particular network. As used herein, the term "client terminal" encompasses a mobile phone, tablet computer, laptop computer, desktop computer, other electronic devices, and any device configured to access cloud service application 14. A client terminal includes one or more computer processors (collectively "client terminal processor") and associated memory. The client terminal processor comprises electronic circuits that enable the client terminal to access cloud service application 14.

Figure 2:
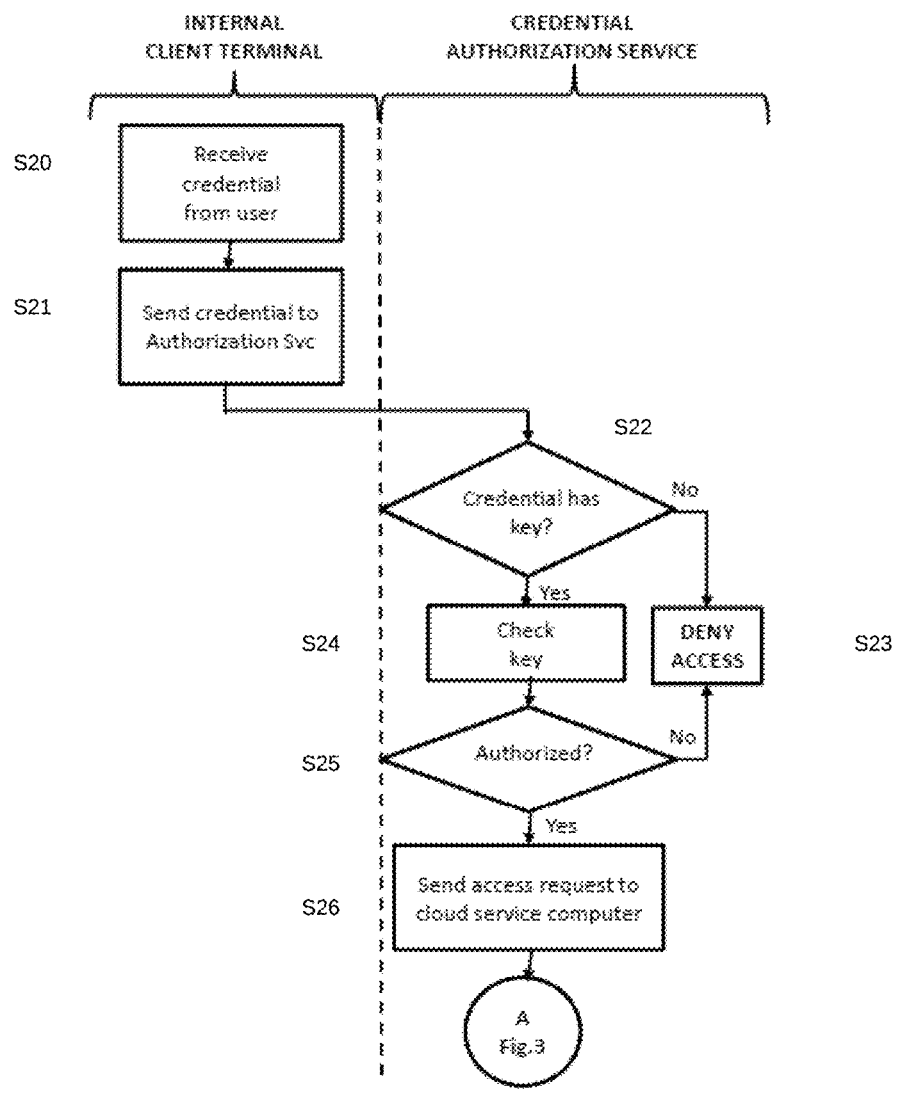
FIGS. 2-4 are flow charts showing an example method for applying key-based security for requests to access one or more cloud service applications.

As shown in FIGS. 1 and 2, a user enters credential 20 to internal client terminal 26. This can be performed by user entry into manual keyboard, touchscreen entry, voice entry, or by using a device configured to acquire a user key. A user key distinguishes the user based on the user inputting a correct key (response key) in response to a key that the user receives (challenge key). The two keys together constitute a key pair which permit access when the correct key pair is provided. In aspects, a key pair is produced in a way that a user can remember. In some aspects, multiple key pairs may be required to enable access. Color, shape, age, geographic location (country, city, state, province), car make, sports team, and numerous other criteria may form the basis for forming a key pair. Internal client terminal 16 receives (S20 in FIG. 2) credential 20.

Examples of key pairs that can permit access could be in various categories, for example, color, age, location, make of car, sport, sports team, or any number of other categories. Examples of keys could be blue (color), 26 (age), California (location), Ferrari (car make), sport (soccer), sports team (Yankees), etc. Table 1 below shows these examples in tabular form:

TABLE 1

| Challenge Key | Response Key (User) |
|---|---|
| Color | Blue |
| Age | 26 |
| Location (Country) | United States |
| Location (City) | Chicago |

TABLE 1-continued

| Challenge Key | Response Key (User) |
| --- | --- |
| Location (State) | California |
| Location (Province) | Alberta |
| Make of Car | Ferrari |
| Sport | Soccer |
| Sports Team | Yankees |

In one aspect, when a user tries to log in, a category could be presented for which the user would have to present the correct key. In another aspect, the user could be asked simply to input a key, without being presented with a category. The system could compare the user's input to the correct responses for the various categories, and if there is a match for one of them, could grant access. In another aspect, a user could be asked to input multiple keys, either with or without prompting of category.

Internal client terminal 16 sends (S21) credential 20 to credential authorization service 22. Credential authorization service 22 includes one or more computer processors (collectively "authorization service processor" herein) and associated memory. The authorization service processor comprises electronic circuits that allow the authorization service processor to perform the process steps described herein. Credential authorization service 22 may include memory, including a non-transitory computer-readable medium, storing instructions for performing the process steps described herein. For example, credential authorization service 22 may comprise server class hardware running a server operating system.

In response to receiving credential 20, credential authorization service 22 determines (S22 in FIG. 2) whether the received credential includes a key. If no, credential authorization service 22 denies access (S23) to cloud service application 14. If yes, credential authorization service 22 checks (S24) the received key. Specifically, credential authorization service 22 sends an authorization request to credential directory 24, which has already stored in it a plurality of user credentials.

Credential directory 24 includes one or more computer processors (collectively "credential directory processor" herein) and associated memory. The credential directory processor comprises electronic circuits that allow the credential directory processor to perform the process steps described herein. Credential directory 24 may include memory, including a non-transitory computer-readable medium, storing instructions for performing the process steps described herein. In addition, credential directory 24 may include mass storage devices, such as solid state drives, hard drives, and optical storage for storing the user credentials. For example, credential directory 24 may comprise server class hardware running a server operating system.

The credentials stored in credential directory 24 may be organized in directories. The directories may be based on types or levels of access associated with various users, or they may be based on other criteria. Next, credential directory 24 sends to credential authorization service 22 an authorization response indicating whether the key is authorized for access to one or more cloud service applications 14. For example, credential authorization service 22 may cause the received credential to be compared with the credentials stored in credential directory 24. Next, credential authorization service 22 determines (S25 in FIG. 2) whether the key is authorized based on the authorization response from credential directory 24. In this example, the authorization response indicates that the user is to be given access, so credential authorization service 22 causes access request 29 to be sent (S26) to cloud service computer 12. Optionally, the access request may be performed with single sign-on (SSO) access control to generate a federated identity for internal client terminal 16. The federated identity allows access across multiple cloud service applications 14. The federated identity may comply with SAML or OpenID protocols, for example. The process continues to point A in FIG. 3.

Figure 3:
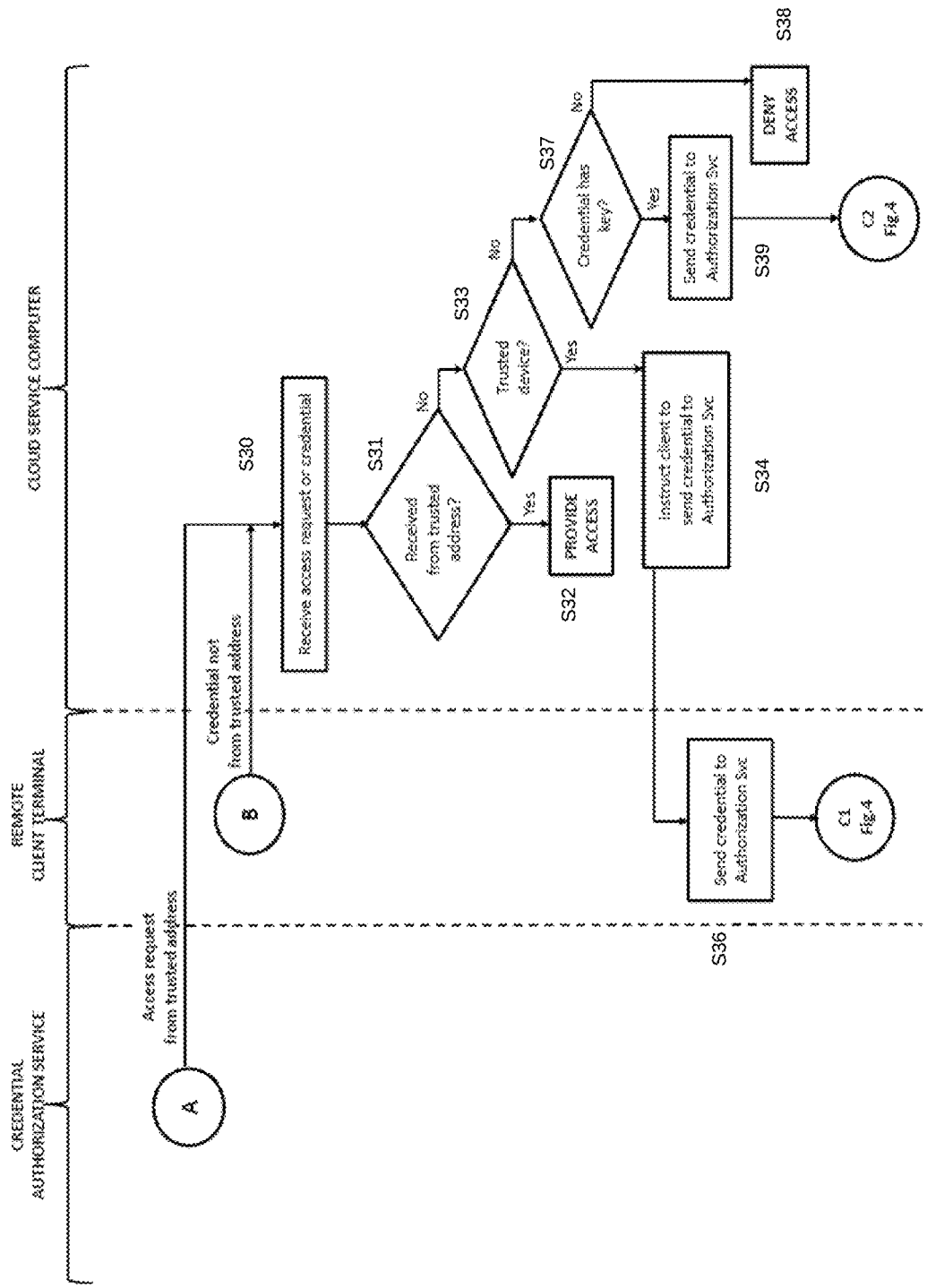

As shown in FIGS. 1 and 3, access request 29 is received (S30 in FIG. 3) by cloud service computer 12. Next, cloud service computer determines (S31) whether access request 29 is received from or is associated with a trusted address. As used herein, a "trusted address" is any one of the addresses associated with network 18. In this example, access request 29 is associated with internal client terminal 16, which has one of the addresses associated with network 18. In response, cloud service computer 12 provides (S32) internal client terminal 16 with access to one or more cloud service applications 14.

The other process steps in FIG. 3 relate to how cloud service computer 12 handles situations in which the current connection is from a device that does not have a trusted address, such as when a remote client terminal connects directly to cloud service computer 12. FIGS. 4-8 show examples of remote client terminal 26 connecting directly to cloud service computer 12 in an attempt to gain access to one or more cloud service applications 14.

As shown in FIGS. 4-8, remote client terminal 26 receives (S40 in FIG. 4) credential 20 from the user. Credential 20 may or may not include a key. For example, credential 20 may include a password and user ID but does not include a key. Remote client terminal 26 has an address that is not any one of the addresses associated with network 18. Remote client terminal 26 sends (S41) credential 20 to cloud service computer 12. Cloud service computer 12 receives (S30 in FIG. 3) the credential. Next, cloud service computer 12 determines (S31) whether the credential is received from or is associated with a trusted address. In FIGS. 5-8, the credential is from remote client terminal 26, which does not have one of the addresses associated with network 18. In response, cloud service computer 12 determines (S33) whether remote client terminal 26 is a trusted device. As used herein, a "trusted device" is a device installed with authorization broker 28, which is software or computer instructions for communicating with credential authorization service 22.

Authorization broker 28 is a software program installed and preconfigured on a device, known as the trusted device. For example, the software, when executed, may cause a client terminal processor to handle pre-validated credential data collected by the client terminal, such as a device ID, user login ID/password, keys, etc. These types of information may be transferred by the client terminal, through the use of the software, to another device.

Figure 4:
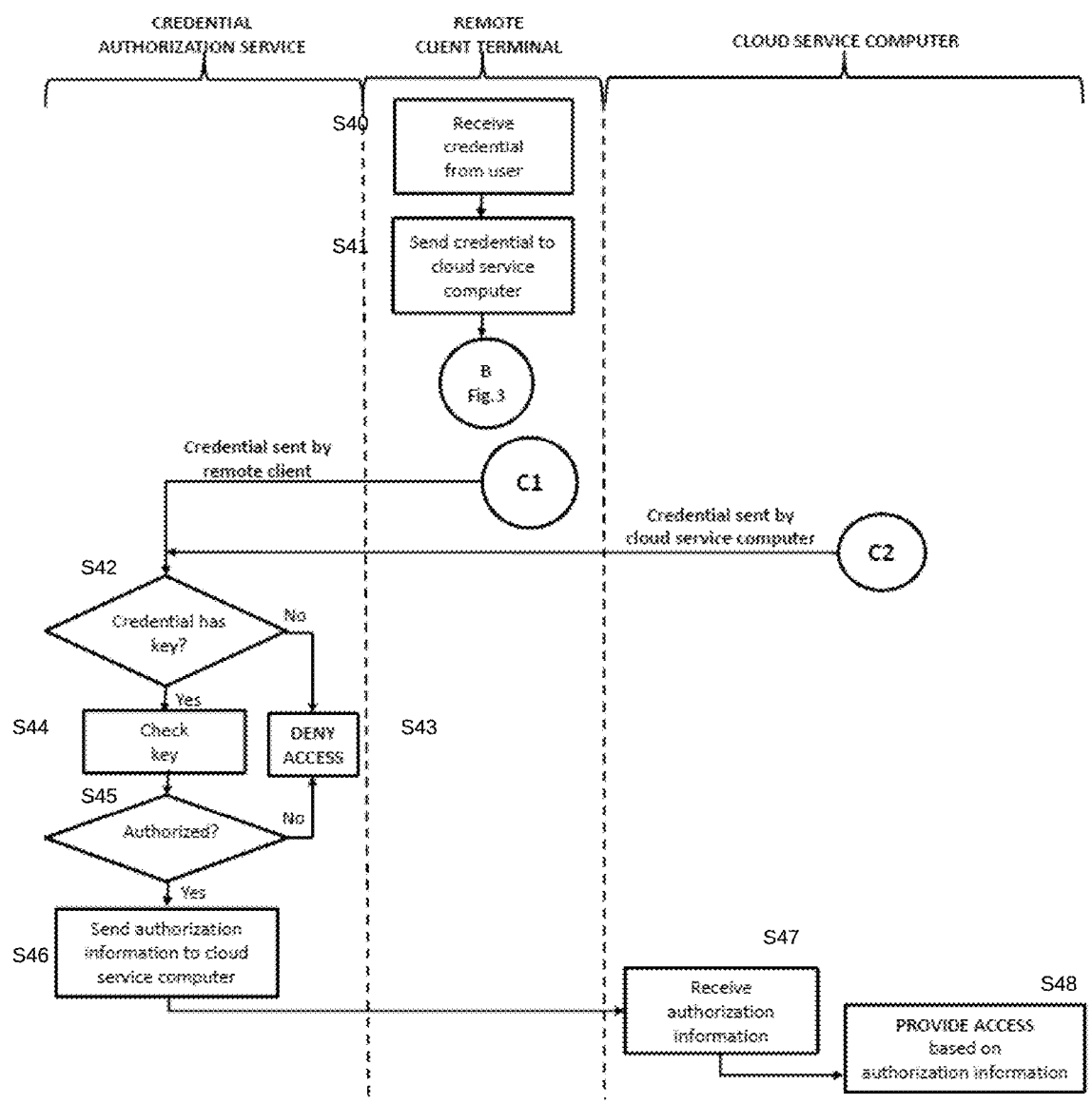
Figure 5:
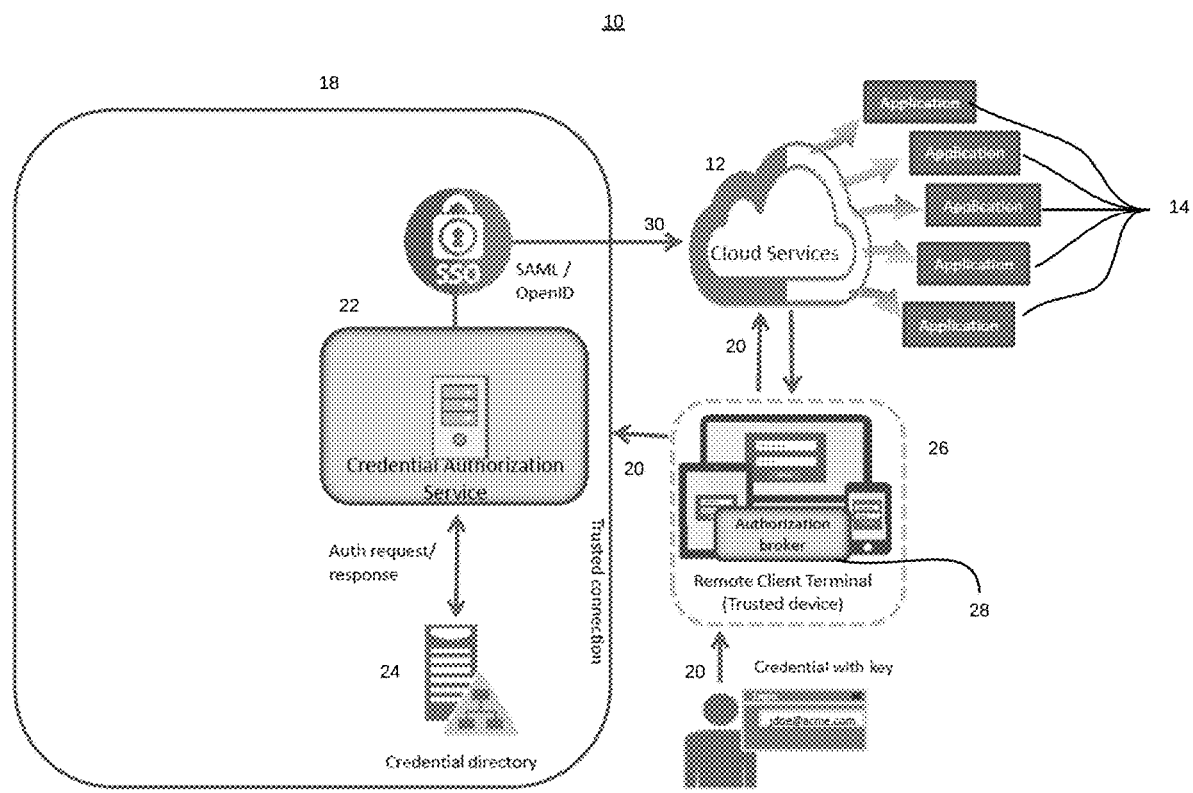
FIGS. 5-8 are schematic diagrams showing the system applying key-based security to requests by remote client terminals, which have addresses that are not associated with the network, to access one or more cloud service applications.

In the example of FIG. 5, remote client terminal 26 is a trusted device since it is installed with authorization broker 28. As used herein, the term "installed" encompasses a condition in which authorization broker 28 is stored in a non-transitory computer readable medium of the client terminal. In response to a determination that remote client terminal 26 is a trusted device, cloud service computer 12 instructs (S34 in FIG. 3) remote client terminal 26 to send, with use of authorization broker 28, credential 20 to credential authorization service 22 to determine whether a key of the credential is authorized. In this particular example, credential 20 does have a key. Remote client terminal 26 receives the instruction and, in response, sends (S36) credential 20 to credential authorization service 22. The process for this example continues to point C1 in FIG. 4, to be discussed later.

In the embodiments described with respect to FIGS. 1 and 5, the user seeking access presents a key (response key) in one of two ways. In one aspect, the user presents a response key after receiving a challenge key, which may come from network 18 directly, or may come from cloud service computer 12. In another aspect, the user presents the response key, but not directly in response to a challenge key. In this aspect, the credential authorization service 22, does not issue a challenge key, but is expecting a particular response key, in a particular category, to determine whether to grant access.

Figure 6A:
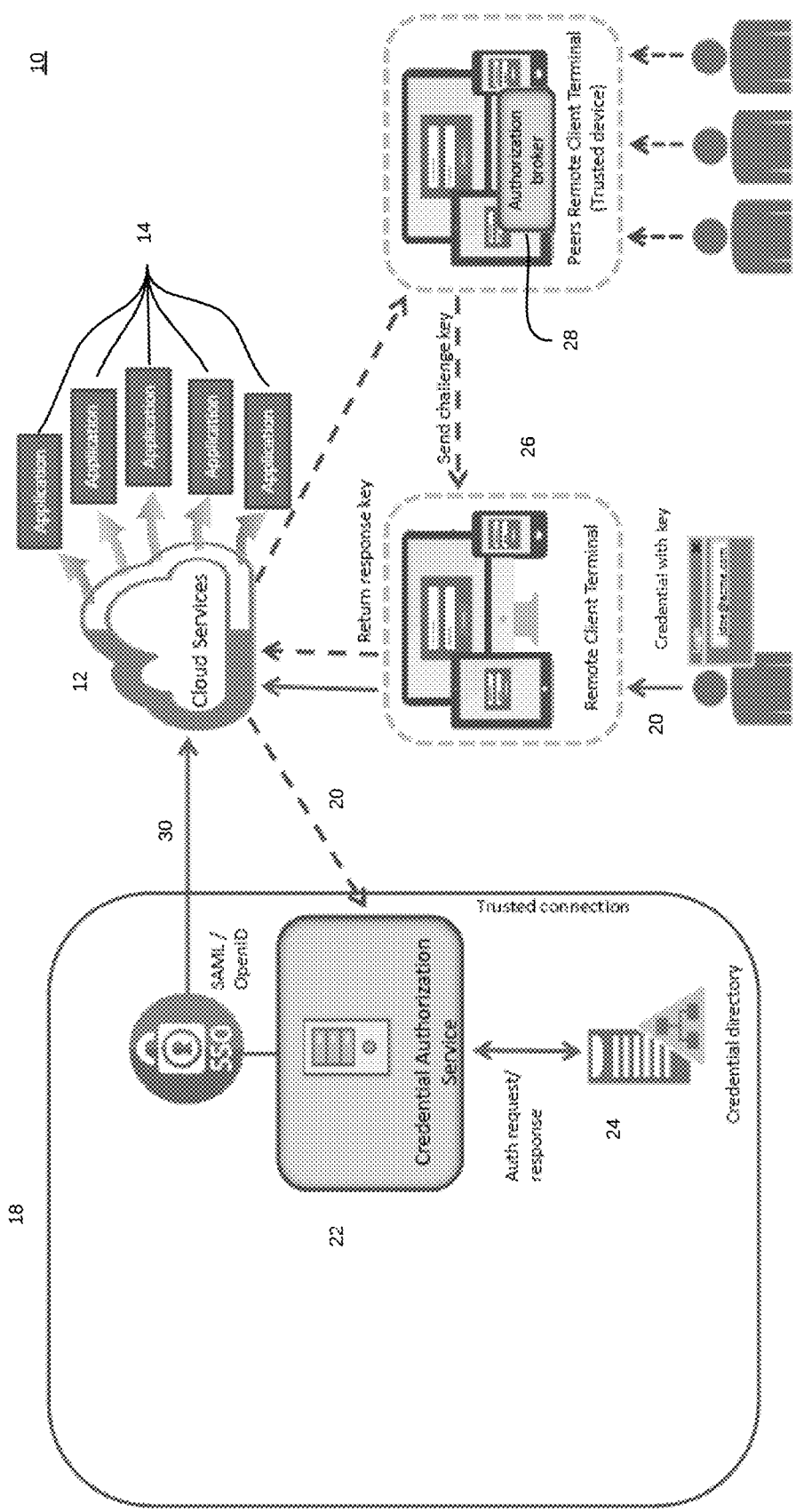

In the example of FIGS. 6A/6B, remote client terminal 26 is not a trusted device since it is not installed with authorization broker 28. In response, cloud service computer 12 determines (S37 in FIG. 3) whether credential 20 has a key. If no, cloud service computer 12 denies (S38) access to cloud service applications 14. If yes, in one aspect, cloud service computer 12 sends (S39) credential 20 to credential authorization service 22 to determine whether the key of the credential is authorized. In another aspect, cloud service computer 12 requires a key which is provided by a peer remote client terminal 26' that has authorization broker 28 (and therefore is a trusted device). Cloud service computer 12 can send credential 20 (with key) to credential authorization service 22.

In the case in which cloud service computer 12 sends the credential 20, with key, to credential authorization service 22, credential authorization service 22 could compare the key, as a response key, to challenge keys for that credential 20. The process for this example then could continue to point C2 in FIG. 4.

Figure 6B:
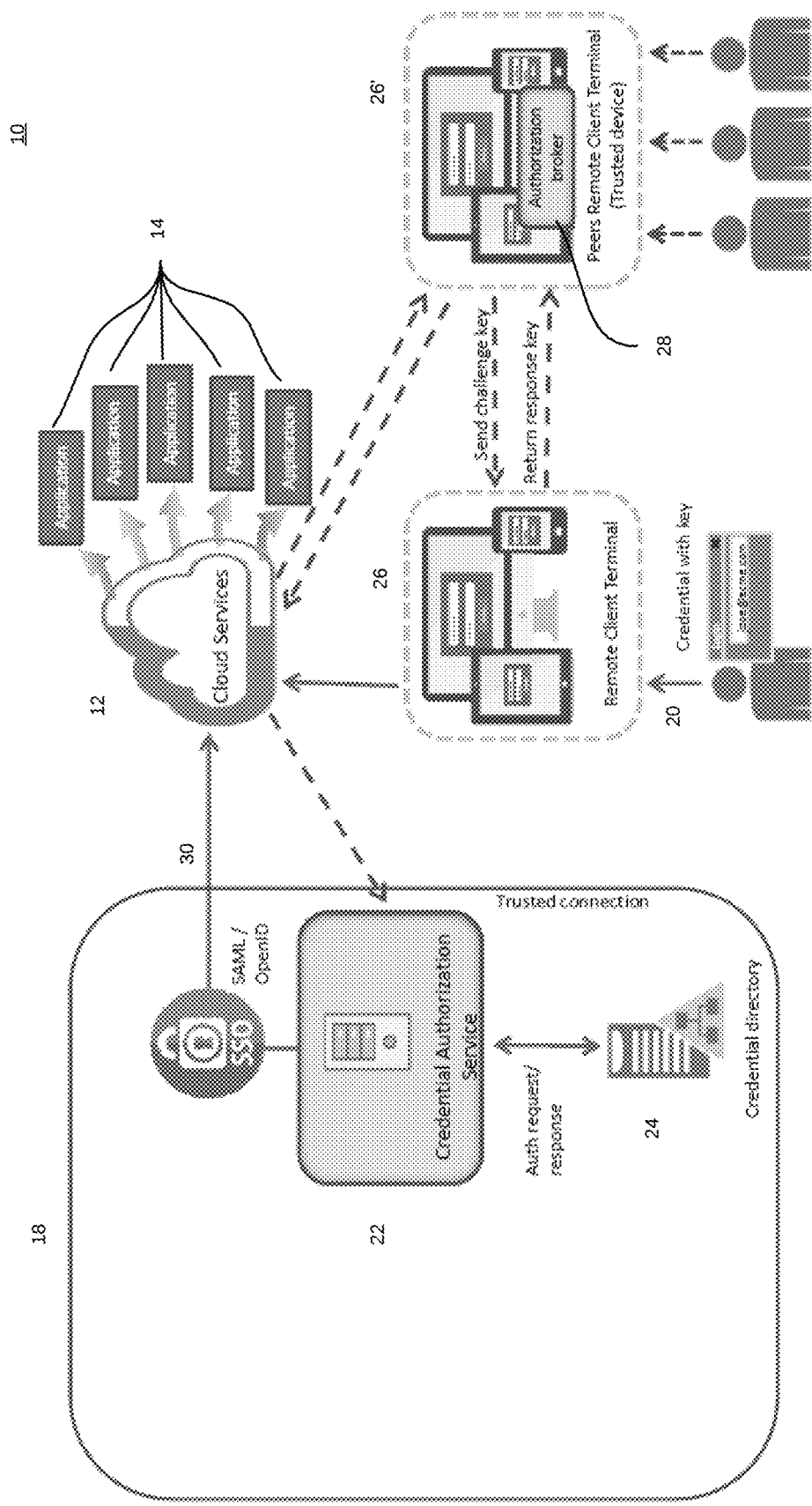

In one aspect, since cloud service computer 12 cannot issue a challenge key to which the key in credential 20 responds, and/or cannot match the response key which is part of credential 20, cloud services computer 12 may enlist a trusted device, from which a challenge key can be sent to the user seeking access. FIG. 6A shows peer remote client terminal 26', which is a trusted device because it has authorization broker 28, sending a challenge key to remote client terminal 26. In FIG. 6B, the remote client terminal 26 with the credential 20 sends the response key to peer remote client terminal 26' with authorization broker 28. Peer remote client terminal 26' then sends the response key to cloud service computer 12, which in turn can send the key to credential authorization service 22 to verify access. In the example of FIG. 6B, the response key travels on a trusted path from peer remote client terminal 26' as a response to a challenge key from that peer remote client terminal 26'. In this case, the process for this example then continues to point C1 in FIG. 4. The cloud service computer 12 sends the response key to credential authorization service 22 to verify access, in which case the process for this example then continues to point C2 in FIG. 4.

In one aspect, the peer remote client terminal 26' does not send a challenge key to remote client terminal 26. Instead, the user seeking access via remote client terminal 26 (which in this instance is not a trusted device) provides the key, as part of credential 20, to the peer remote client terminal 26'. Peer remote client terminal 26' then sends the key to cloud service computer 12, which in turn transmits the key to credential authorization service 22, which enables grant or denial of access similarly to the manner described above.

In the example of FIGS. 6A/6B, there may be one or more multiple peer remote client terminals 26', each with the capability of providing one or more challenge keys to the user. Multiple users, each with one or more challenge keys, may be able to access the same peer remote client terminal 26'. In another aspect, each user with one or more challenge keys may access a different peer remote client terminal 26'. In one aspect, a single user may provide a challenge key. In other aspects, two or more users may present a challenge key. In other aspects, a user may have one challenge key, or more than one challenge key. Examples are as set forth below in Table 2:

TABLE 2

| Response Key | Challenge Key(s) User | | | | | Key Pair(s) |
| --- | --- | --- | --- | --- | --- | --- |
| | User 1 | User 2 | User 3 | User 4 | User N | |
| Blue | Color | | | Color | | User 1: Color<br>User: Blue<br>User 4: Color<br>User: Blue |
| 26 | | | Age | | Age | User 3: Age<br>User: 26<br>User N: Age<br>User: 26 |
| California | | | Location | | Location | User 3: Location<br>User: California<br>User N: Location<br>User: California |
| Ferrari | | | | Make of Car | Make of Car | User 4: Make of Car<br>User: Ferrari<br>User N: Make of Car<br>User: Ferrari |
| Soccer | | Sport | Sport | | Sport | User 2: Sport<br>User: Soccer<br>User 3: Sport<br>User: Soccer<br>User N: Sport<br>User: Soccer |
| Yankees | | Sports Team | | Sports Team | | User 2: Sports Team<br>User: Yankees |

TABLE 2-continued

| Response Key | Challenge Key(s) User | | | | | Key Pair(s) |
|---|---|---|---|---|---|---|
| | User 1 | User 2 | User 3 | User 4 | User N | |
| | | | | | | User 4: Sports Team User: Yankees |

For the examples of FIGS. 5 and 6A/6B, the process continues according to the flow chart of FIG. 4. As shown in FIG. 4, credential authorization service 22 receives credential 20 that was received (S40) by remote client terminal 26 from the user. The credential may have been sent by a trusted device installed with authorization broker 28 (e.g., remote client terminal 26 in FIG. 5) or by cloud service computer 12 (e.g., because remote client terminal 26 in FIG. 6A is not installed with authorization broker 28). Next, credential authorization service 22 determines (S42) whether the received credential has a key. If no, credential authorization service 22 denies (S43) access to cloud service applications 14. If yes, credential authorization service 22 checks (S44) the received key and determines (S45) whether the key is authorized. The checking (S44) and determination (S45) in FIG. 4 are performed as described for the checking (S24) and determination (S25) in FIG. 2. If the key is authorized, credential authorization service 22 sends (S46) authorization information 30 to cloud service computer 12.

Cloud service computer 12 receives (S47 in FIG. 4) authorization information 30. Since cloud service computer 12 may be handling many connections from different remote client terminals, the authorization information it receives may allow it to provide access to the correct remote client terminal. Next, cloud service computer 12 provides access (S48) to cloud service application 14 based on the received authorization information. For example, the authorization information can be a token including an item of information associated with the particular remote client terminal (e.g., remote client terminal 26 in FIG. 5 or 6) that is requesting access. The token can be the key in the credential entered by the user into remote client terminal 26, a user identifier of that user, a device identifier of the remote client terminal 26, and/or other information. Furthermore, the token can be hashed using a cryptographic hash function. Hashing may be performed to ensure that the received authorization information corresponds to remote client terminal 26 or credential 20 received by remote client terminal 26. Additionally or alternatively, hashing may be performed for creating a blockchain record.

It is to be understood from the above description that cloud service computer 12 performs one of two credential handling responses S34 and S39 in FIG. 3, depending on whether remote client terminal 26 has installed thereon authorization broker 28 (i.e., depending on remote client terminal 26 is a trusted device).

In FIG. 5, the credential handling response is to instruct (S34 in FIG. 3) remote client terminal 26 to send credential 20 to credential authorization service 22 to determine whether a key of the credential 20 is authorized for access. The instructing (S34) is performed on condition that remote client terminal 26 is a trusted device. In addition, credential 20 is sent with the use of authorization broker 28. Here, cloud service computer 12 does not send credential 20 to credential authorization service 22.

In FIGS. 6A and 6B, the credential handling response is to send (S39 in FIG. 3) credential 20 to credential authorization service 22 to determine whether a key in credential 20 is authorized for access. The sending (S39) performed on condition that remote client terminal 26 is not a trusted device. Here, remote client terminal 26 does not send credential 20 to credential authorization service 22.

Figure 7:
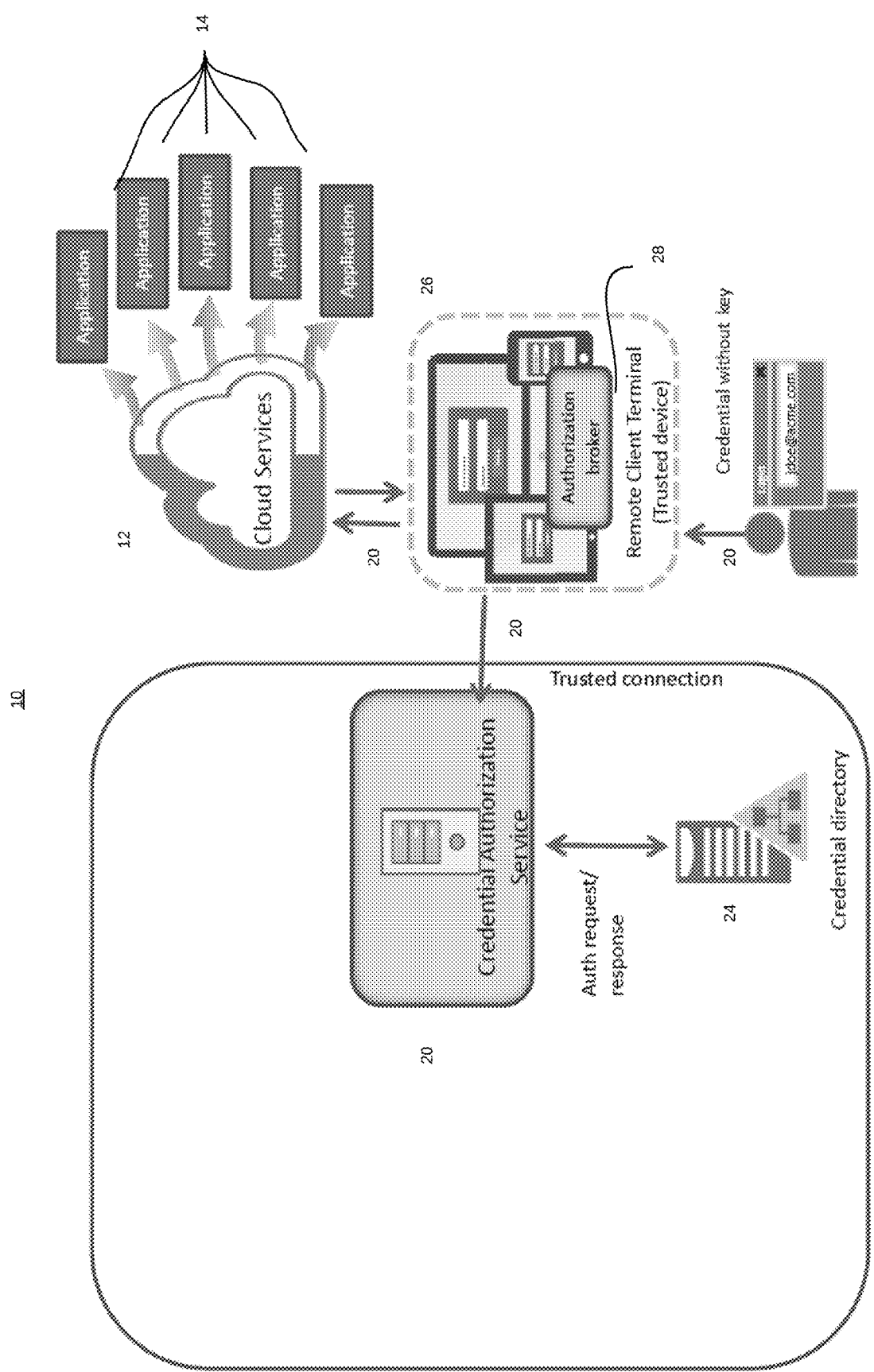
Figure 8:
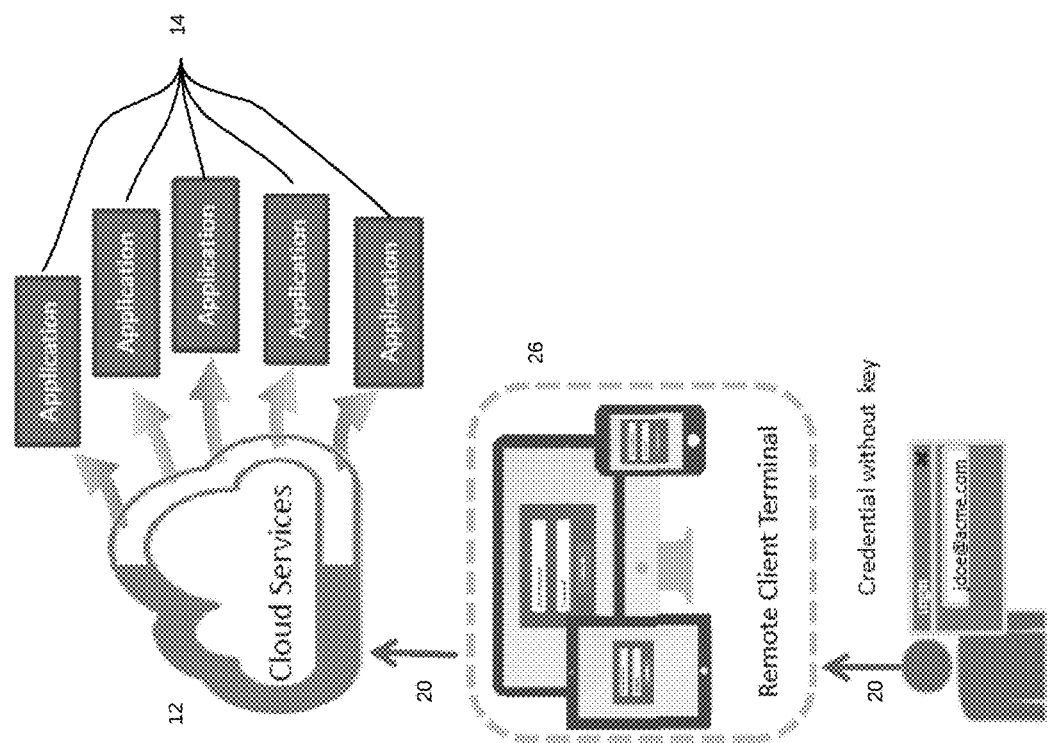
Figure 8:
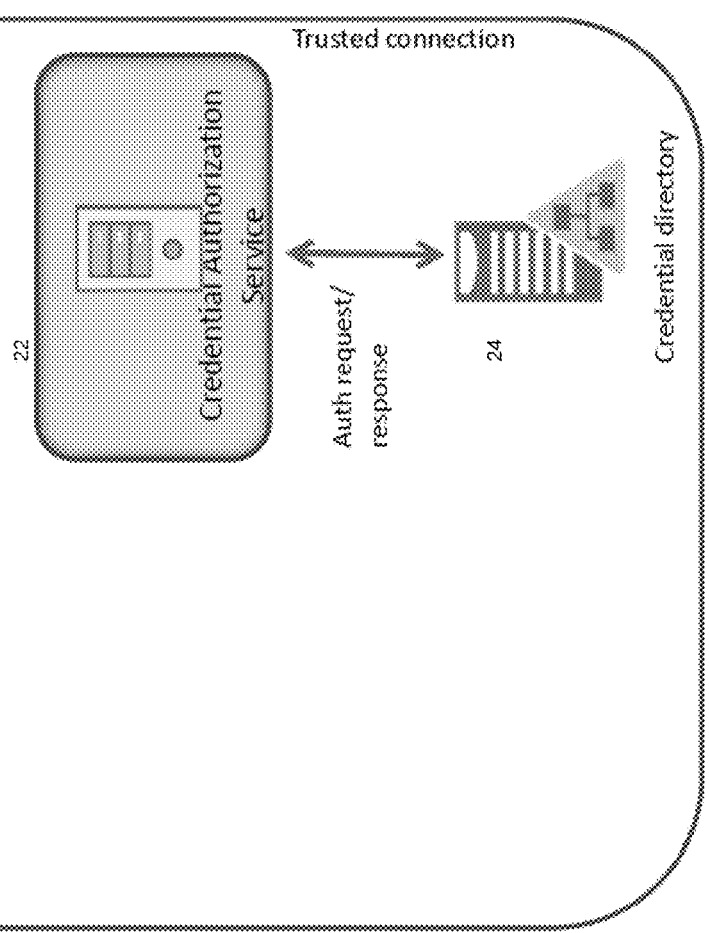

FIG. 5 is an example of remote client terminal 26 connecting to cloud service computer 12 when the user provides a credential with a key. FIGS. 7 and 8 show similar examples except the user provides a credential without a key. For example, the user may provide a credential with a user ID and password, but no key.

In FIG. 7, remote client terminal 26 is a trusted device since it is installed with authorization broker 28. Thus, when remote client terminal 26 sends (S41 in FIG. 4) credential 20 to cloud service computer 12, cloud service computer 12 instructs (S34 in FIG. 3) remote client terminal 26 to send credential 20 to credential authorization service 22. Remote client terminal 26 sends (S36) credential 20 to credential authorization service 22. Next, credential authorization service 22 determines (S42 in FIG. 4) that credential 20 does not have a key. Therefore, credential authorization service 22 denies (S43) access to cloud service applications 14.

In FIG. 8, remote client terminal 26 is a not trusted device since it is not installed with authorization broker 28. Thus, when remote client terminal 26 sends (S41 in FIG. 4) credential 20 to cloud service computer 12, cloud service computer 12 determines (S37 in FIG. 3) that credential 20 does not have a key. Therefore, cloud service computer 12 denies (S38) access to cloud service applications 14.

In more detail, cloud service computer 12 in FIG. 8 performs the following actions. Cloud service computer 12 receives (S30 in FIG. 3) remote credential 20 for accessing the cloud service application, the remote credential having been provided by remote client terminal 26 having an address that is not associated with network 18. Next, cloud service computer 12 determines (S33) whether remote client terminal 26 is a trusted device installed with an authorization broker for communicating with credential authorization service 22. In response to a determination that remote client terminal 26 is not a trusted device, cloud service computer 12 determines (S37) whether the second remote credential has a key. In response to a determination that the second remote credential does not have a key, cloud service computer 12 denies (S38) remote client terminal 26 from accessing cloud service applications 14.

Users associated with different organizations may want to access cloud service applications 14. For example, one company may have employees that work internally and remotely from its secured network. Another company may have employees that work internally and remotely from its secured network. Each company may administer keys of its employees independently of the other company. Advantageously, cloud service computer 12, as described above, may handle two or more networks. Each network has internal client terminals accessing cloud service applications 14 through the respective network, and has remote client terminals accessing cloud service applications 14 via direct connection to cloud service computer 12.

Figure 9:
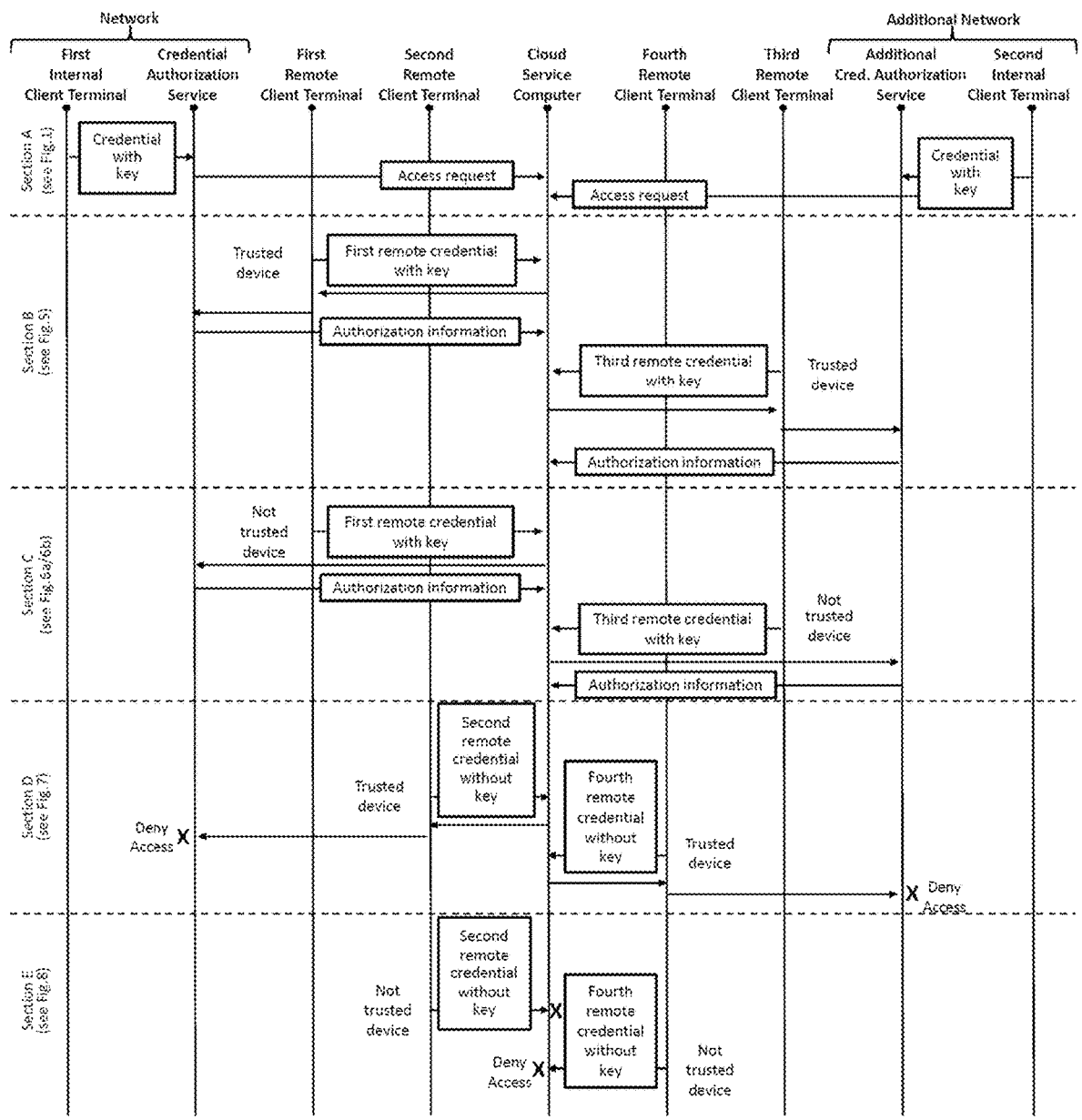
FIG. 9 is a flow diagram showing the system applying key-based security to requests by client terminals associated with two networks.

FIG. 9 shows system 10 comprising two networks (as discussed above) with various internal client terminals and remote client terminals. The first internal client terminal has an address (e.g., an IP address) associated with a network. The first and second remote terminals are operated by users with credentials associated the network but are operated at addresses (e.g., at IP addresses) that are not associated with the network. There is an additional network that is separate and distinct from the other network. The configuration of both networks may be as described for network 18 above. The second internal client terminal has an address (e.g., an IP address) associated with the additional network. The third and fourth remote terminals are operated by users with credentials associated the additional network but are operated at addresses (e.g., at IP addresses) that are not associated with the additional network.

In FIG. 9, section A shows internal client terminals operating as described in FIG. 1 and the flow charts of FIGS. 2 and 3. Section B shows remote client terminals (trusted devices) operating as described in FIG. 5 and the flow charts of FIGS. 3 and 4. Section C shows remote client terminals (not trusted devices) operating as described in FIG. 6 and the flow charts of FIGS. 3 and 4. Section D shows remote client terminals (trusted devices) operating as described in FIG. 7 and the flow charts of FIGS. 3 and 4. Section E shows remote client terminals operating as described in FIG. 8 and the flow charts of FIGS. 3 and 4.

It will be appreciated from the above description that cloud service computer 12 uses the credential authorization service that is native to a local network. This allows the key-based security measures of the local network to be applied when a remote client terminal connects directly to cloud service computer 12. The direct connection to cloud service computer 12 may allow for enhanced performance of the remote client terminal as compared to other modes of connection through the local network. In addition, cloud service computer 12 is able to service multiple local networks while allowing each network to administer its own key-based security measures. For example, one network may use a color as a key, while another network may use geographic location as a key.

While several particular forms of the invention have been illustrated and described, it will also be apparent that various modifications may be made without departing from the scope of the invention. It is also contemplated that various combinations or subcombinations of the specific features and aspects of the disclosed embodiments may be combined with or substituted for one another in order to form varying modes of the invention. Accordingly, it is not intended that the invention be limited, except as by the appended claims.

What is claimed is:

1. A method performed by a computer for applying security, the computer configured to provide client terminals, which have addresses associated with a network and have credentials authorized by a credential authorization service, with access to a cloud service application, the method comprising:

providing access to the cloud service application to an internal client terminal having one of the addresses associated with the network and having provided a credential that was authorized by the credential authorization service;

receiving a first remote credential for accessing the cloud service application, the first remote credential provided by a first remote client terminal having an address that is not associated with the network;

determining whether the first remote client terminal is a trusted device installed with an authorization broker for communicating with the credential authorization service;

performing a credential handling response for the first remote credential, the credential handling response being either:

instructing the first remote client terminal to send, with use of the authorization broker installed on the first remote client terminal, the first remote credential to the credential authorization service to determine whether a key of the first remote credential is authorized for access, the instructing performed on condition that the first remote client terminal is a trusted device, or sending the first remote credential to the credential authorization service to determine whether a key in the first remote credential is authorized for access, the sending performed on condition that the first remote client terminal is not a trusted device; and after a determination by the credential authorization service that the key of the first remote credential is authorized for access, receiving authorization information to provide the first remote client terminal with access to the cloud service application.

2. The method of claim 1, further comprising:

before performing the credential handling response and in response to a determination that the first remote terminal is not a trusted device, determining whether the first remote credential includes a key, wherein the credential handling response is sending the first remote credential to the credential authorization service, and the sending is performed on condition that the first remote client terminal is not a trusted device and that the first remote credential includes the key.

3. The method of claim 1, further comprising:

selecting a peer remote client terminal which is a trusted device and stores a challenge key.

4. The method of claim 1, wherein the sending the first remote credential to the credential authorization service is carried out by sending the first remote credential to a peer remote client terminal that is a trusted device.

5. The method of claim 1, wherein the key of the first remote credential is a response key that is sent in response to receipt of a challenge key.

6. The method of claim 1, further comprising:

receiving a second remote credential for accessing the cloud service application, the second remote credential provided by a second remote client terminal having an address that is not associated with the network;

determining whether the second remote client terminal is a trusted device installed with an authorization broker for communicating with the credential authorization service;

in response to a determination that the second remote client terminal is not a trusted device, determining whether the second remote credential has a key; and in response to a determination that the second remote credential does not have a key, denying the second remote client terminal from accessing the cloud service application.

7. The method of claim 1, wherein the authorization information, which was received to provide the first remote client terminal with access to the cloud service application, is a token including an item of information associated with the first remote client terminal.

8. The method of claim 1, wherein the item of information included in the token is an item selected from the group consisting of the key, a user identifier of a person using the first remote client terminal, and a device identifier of the first remote client terminal.

9. The method of any of claim 1, wherein the computer is configured to provide client terminals, which have addresses associated with an additional network and have credentials authorized by an additional credential authorization service, with access to the cloud service application, the method comprising:
   providing access to the cloud service application to an internal client terminal having one of the addresses associated with the additional network and having provided a credential that was authorized by the additional credential authorization service;
   receiving a third remote credential for accessing the cloud service application, the third remote credential provided by a third remote client terminal having an address that is not associated with the additional network;
   determining whether the third remote client terminal is a trusted device installed with an authorization broker configured to communicate with the additional credential authorization service;
   performing a credential handling response for the third remote credential, the credential handling response for the third remote credential being either:
      instructing the third remote client terminal to send, with use of the authorization broker installed on the third remote client terminal, the third remote credential to the additional credential authorization service to determine whether a key of the third remote credential is authorized for access, the instructing performed on condition that the third remote client terminal is a trusted device, or
      sending the third remote credential to the additional credential authorization service to determine whether a key in the third remote credential is authorized for access, the sending performed on condition that the third remote client terminal is not a trusted device; and
   after a determination by the additional credential authorization service that the key of the third remote credential is authorized for access, receiving authorization information to provide the third remote client terminal with access to the cloud service application.

10. A system for applying security, the system configured to provide client terminals, which have addresses associated with a network and have credentials authorized by a credential authorization service, with access to a cloud service application, the system comprising:
   a computer configured to perform a method comprising:
      providing access to the cloud service application to an internal client terminal having one of the addresses associated with the network and having provided a credential that was authorized by the credential authorization service;
      receiving a first remote credential for accessing the cloud service application, the first remote credential provided by a first remote client terminal having an address that is not associated with the network;
      determining whether the first remote client terminal is a trusted device installed with an authorization broker for communicating with the credential authorization service;
      performing a credential handling response for the first remote credential, the credential handling response being either:
         instructing the first remote client terminal to send, with use of the authorization broker installed on the first remote client terminal, the first remote credential to the credential authorization service to determine whether a key of the first remote credential is authorized for access, the instructing performed on condition that the first remote client terminal is a trusted device, or
         sending the first remote credential to the credential authorization service to determine whether a key in the first remote credential is authorized for access, the sending performed on condition that the first remote client terminal is not a trusted device; and
      after a determination by the credential authorization service that the key of the first remote credential is authorized for access, receiving authorization information to provide the first remote client terminal with access to the cloud service application.

11. The system of claim 10, wherein the method, which the computer is configured to perform, comprises:
   before performing the credential handling response and in response to a determination that the first remote terminal is not a trusted device, determining whether the first remote credential includes a key,
   wherein the credential handling response is sending the first remote credential to the credential authorization service, and the sending is performed on condition that the first remote client terminal is not a trusted device and that the first remote credential includes the key.

12. The system of claim 10, wherein the method, which the computer is configured to perform, further comprises:
   selecting a peer remote client terminal which is a trusted device and stores a challenge key.

13. The system of claim 10, wherein the sending the first remote credential to the credential authorization service is carried out by sending the first remote credential to a peer remote client terminal that is a trusted device.

14. The system of claim 10, wherein the key of the first remote credential is a response key that is sent in response to receipt of a challenge key.

15. The system of claim 10, wherein the method, which the computer is configured to perform, further comprises:
   receiving a second remote credential for accessing the cloud service application, the second remote credential provided by a second remote client terminal having an address that is not associated with the network;
   determining whether the second remote client terminal is a trusted device installed with an authorization broker for communicating with the credential authorization service;
   in response to a determination that the second remote client terminal is not a trusted device, determining whether the second remote credential has a key; and
   in response to a determination that the second remote credential does not have a key, denying the second remote client terminal from accessing the cloud service application.

16. A non-transitory computer-readable medium storing instructions, which when executed by a computer, cause the computer to perform a method for applying security, the computer configured to provide client terminals, which have addresses associated with a network and have credentials authorized by a credential authorization service, with access to a cloud service application, the method comprising:

provides access to the cloud service application to an internal client terminal having one of the addresses associated with the network and having provided a credential that was authorized by the credential authorization service;

receiving a first remote credential for accessing the cloud service application, the first remote credential provided by a first remote client terminal having an address that is not associated with the network;

determining whether the first remote client terminal is a trusted device installed with an authorization broker for communicating with the credential authorization service;

performing a credential handling response for the first remote credential, the credential handling response being either:

instructing the first remote client terminal to send, with use of the authorization broker installed on the first remote client terminal, the first remote credential to the credential authorization service to determine whether a key of the first remote credential is authorized for access, the instructing performed on condition that the first remote client terminal is a trusted device, or sending the first remote credential to the credential authorization service to determine whether a key in the first remote credential is authorized for access, the sending performed on condition that the first remote client terminal is not a trusted device; and after a determination by the credential authorization service that the key of the first remote credential is authorized for access, receiving authorization information to provide the first remote client terminal with access to the cloud service application.

17. The non-transitory computer-readable medium of claim 16, wherein the method further comprises:

before performing the credential handling response and in response to a determination that the first remote terminal is not a trusted device, determining whether the first remote credential includes a key, wherein the credential handling response is sending the first remote credential to the credential authorization service, and the sending is performed on condition that the first remote client terminal is not a trusted device and that the first remote credential includes the key.

18. The non-transitory computer-readable medium of claim 16, wherein the method further comprises:

selecting a peer remote client terminal which is a trusted device and stores a challenge key.

19. The non-transitory computer-readable medium of claim 16, wherein the sending the first remote credential to the credential authorization service is carried out by sending the first remote credential to a peer remote client terminal that is a trusted device.

20. The non-transitory computer-readable medium of any of claim 16, wherein the key of the first remote credential is a response key that is sent in response to receipt of a challenge key.

* * * * *